United States Patent
Asao et al.

(10) Patent No.: US 7,545,061 B2
(45) Date of Patent: Jun. 9, 2009

(54) ROTATING ELECTRIC MACHINE FOR VEHICLES

(75) Inventors: Yoshihito Asao, Tokyo (JP); Yutaka Kitamura, Tokyo (JP); Hiroaki Aso, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/501,036

(22) Filed: Aug. 9, 2006

(65) Prior Publication Data

US 2007/0035185 A1    Feb. 15, 2007

(30) Foreign Application Priority Data

Aug. 11, 2005    (JP) .............................. 2005-232694

(51) Int. Cl.
*H02K 9/06* (2006.01)

(52) U.S. Cl. .............................. 310/58; 310/59; 310/62

(58) Field of Classification Search .................. 310/58, 310/59, 68 D, 62, 60 A
See application file for complete search history.

(56) References Cited

U.S. PATENT DOCUMENTS

| | | | | |
|---|---|---|---|---|
| 3,838,302 | A | * | 9/1974 | Dreissigacker et al. ..... 310/68 D |
| 5,552,988 | A | * | 9/1996 | Kawaguchi et al. ............ 701/70 |
| 5,677,616 | A | * | 10/1997 | Ooiwa .......................... 322/17 |
| 5,710,467 | A | * | 1/1998 | Irie et al. ....................... 310/64 |
| 5,729,063 | A | * | 3/1998 | Adachi et al. ............. 310/68 D |
| 6,184,600 | B1 | * | 2/2001 | Asao et al. ..................... 310/64 |
| 6,724,108 | B2 | * | 4/2004 | Nakano ..................... 310/68 D |
| 6,740,995 | B2 | * | 5/2004 | Oohashi et al. ........... 310/68 D |
| 6,809,443 | B2 | * | 10/2004 | Nakamura et al. ........ 310/68 D |
| 6,812,604 | B2 | * | 11/2004 | Braun et al. .............. 310/68 D |
| 7,015,607 | B1 | * | 3/2006 | Ikuta et al. ..................... 310/64 |
| 7,026,733 | B2 | * | 4/2006 | Bitsche et al. ............ 310/68 R |
| 7,196,439 | B2 | * | 3/2007 | Pierret et al. ................... 310/58 |
| 2004/0041476 | A1 | * | 3/2004 | Ihata et al. ................ 310/68 D |
| 2004/0263008 | A1 | * | 12/2004 | Voigt et al. ..................... 310/58 |
| 2005/0156480 | A1 | * | 7/2005 | Imai et al. .................... 310/263 |
| 2007/0035185 | A1 | * | 2/2007 | Asao et al. ..................... 310/58 |
| 2007/0035186 | A1 | * | 2/2007 | Asao et al. ..................... 310/58 |

FOREIGN PATENT DOCUMENTS

| | | | |
|---|---|---|---|
| JP | H2-14368 | U | 9/1990 |
| JP | 03-178540 | | 8/1991 |
| JP | 2001169510 | A * | 6/2001 |
| JP | 2002-125346 | A | 4/2002 |
| JP | 2004-080916 | A | 3/2004 |
| JP | 2004-274992 | A | 9/2004 |
| JP | 2004-282905 | | 10/2004 |

* cited by examiner

*Primary Examiner*—Tran N Nguyen
(74) *Attorney, Agent, or Firm*—Sughrue Mion, PLLC

(57) ABSTRACT

A rotating electric machine for vehicles is capable of improving a cooling performance of switching elements forming an inverter module, and small-sizing the entire rotating electric machine. The rotating electric machine includes: a stator; a rotor, a cooling fan; a front bracket and a rear bracket; and a cover; and in which a pair of switching elements are disposed axially adjacent to each other between the rear bracket and the cover; a ventilation hole for sucking an outside air is formed on an axial wall of the cover; and by rotation of the cooling fan, the outside air flows from the ventilation hole with respect to the switching elements, and goes through a suction port and is discharged through a discharge port.

9 Claims, 4 Drawing Sheets

ROTATING ELECTRIC MACHINE FOR VEHICLES

BACKGROUND OF THE INVENTION

1. Field of the Invention

The present invention relates to an rotating electric machine on which a power element unit making an inverter control is mounted and, more particularly, to a power inverter type electric rotating machine for vehicles used in, e.g., motor generators, and power steering motors.

2. Description of the Related Art

Conventionally, a power element unit for making an inverter control of a rotating electric machine, for example, as disclosed in the Japanese Patent Publication (unexamined) No. 274992/2004 (pages 17 to 19, FIGS. 1 to 5), is provided with an inverter module that is formed of a plurality of switching elements (power elements such as power transistors, MOSFET, or IGBT) and diodes connected in parallel to each of the switching elements.

In the inverter module, letting the switching element and diode forming an upper arm and the switching element and diode forming a lower arm that are connected in series one set, these three sets are connected in parallel.

An armature winding is in Y-connection. Ends of each phase of the Y-connection are electrically connected to an intermediate point between the switching elements of the upper arm and the switching elements of the lower arm that are connected in series forming one set via an AC wiring corresponding to each of the phases.

Furthermore, as to terminals of a battery, a positive electrode terminal is electrically connected to the positive electrode side of the inverter module, and a negative electrode terminal is electrically connected to the negative electrode side of the inverter module, respectively via a DC wiring.

In the inverter module, the switching operation of each of the switching elements is controlled by commands from a control circuit. Further, the control circuit controls a field current control circuit to adjust a field current to carry through the field winding of the rotor.

Since a large power loss occurs at the time of switching and conduction of the switching elements in the inverter module in driving the mentioned conventional rotating electric machine, it is a particularly important problem to be solved that each of the switching elements forming an inverter module is cooled.

For example, in the cooling system disclosed in the Japanese Patent Publication (unexamined) No. 274992/2004, a power element unit containing an inverter module is located in a circumferential direction on a heat sink at one end in an axial direction of the rotating electric machine, a cooling air is made to flow in flow paths of cooling fins one after another along the cooling fins provided with the flow paths in the radial direction, thereby cooling the heat sinks.

Since the power element unit containing an inverter module according to the mentioned prior art is located in the circumferential direction on the heat sink at one end in the axial direction of the rotating electric machine, a cooling air is made to flow in flow paths of cooling fins one after another along the cooling fins provided with the flow paths in the radial direction, thereby cooling the heat sinks, a problem exists in that a cooling air having been warmed flows into the next cooling fin, eventually resulting in lower cooling performance.

SUMMARY OF THE INVENTION

The present invention has been made to solve the problems as mentioned above, and has an object of providing an rotating electric machine for vehicles capable of improving a cooling performance of switching elements forming an inverter module, and making the entire electric rotating machine small-sized.

A rotating electric machine for vehicles according to the invention comprises a stator provided with an armature winding, a rotor including a rotary shaft and which is located inside the stator, a cooling fan located at the rotor, a housing that supports and fixes the stator, as well as supports the rotary shaft in a rotatable manner, and a cover that is located outside of one wall surface of the housing in an axial direction of the rotary shaft so as to cover the one wall surface, and that forms a space with the one wall surface of the housing. In this rotating electric machine, switching elements of an upper arm and a lower arm that are connected in series forming an inverter circuit to be connected to the mentioned armature winding are disposed adjacent to each other in the axial direction of the mentioned rotary shaft. A ventilation hole for sucking an outside air is formed on a wall in the axial direction of the rotary shaft of the cover, A suction port through which an air in the space is sucked into the housing is formed in the one wall of the housing, A discharge port through which the air in the housing is discharged is formed in the radially outer circumferential portion of the housing. And when the cooling fan is brought in rotation, the outside air flows axially from the ventilation hole with respect to the switching elements of the upper arm and the lower arm, goes through the suction port, and then is discharged from the discharge port.

In the rotating electric machine of above construction according to the invention, it is possible to improve a cooling performance of switching elements, as well as to make the entire rotating electric machine for vehicles small-sized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
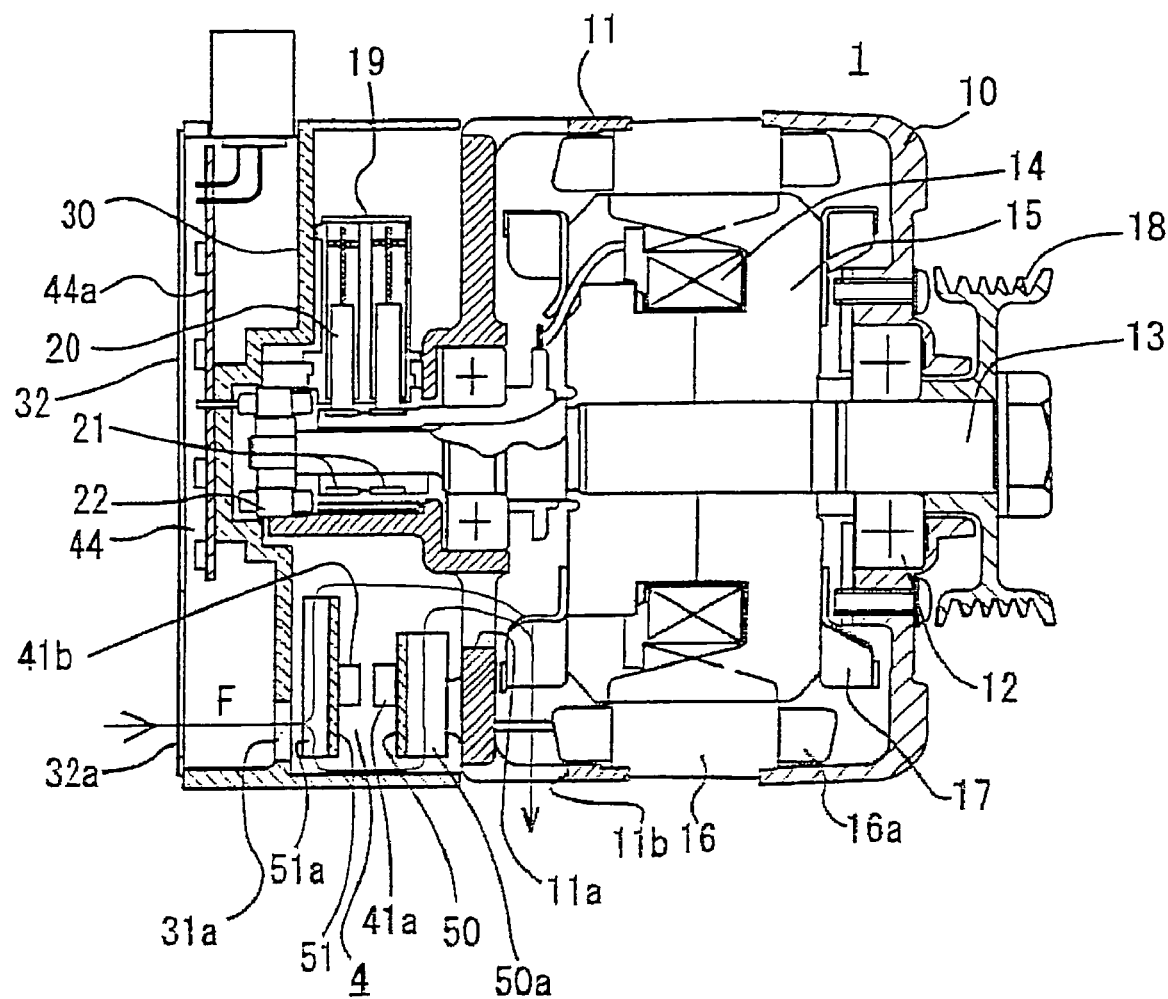
FIG. 1 is a cross sectional view showing a first preferred embodiment of a rotating electric machine for vehicles according to the present invention.

Several preferred embodiments of a rotating electric machine for vehicles according to the present invention are hereinafter described referring to the drawings.

Embodiment 1

Figure 2:
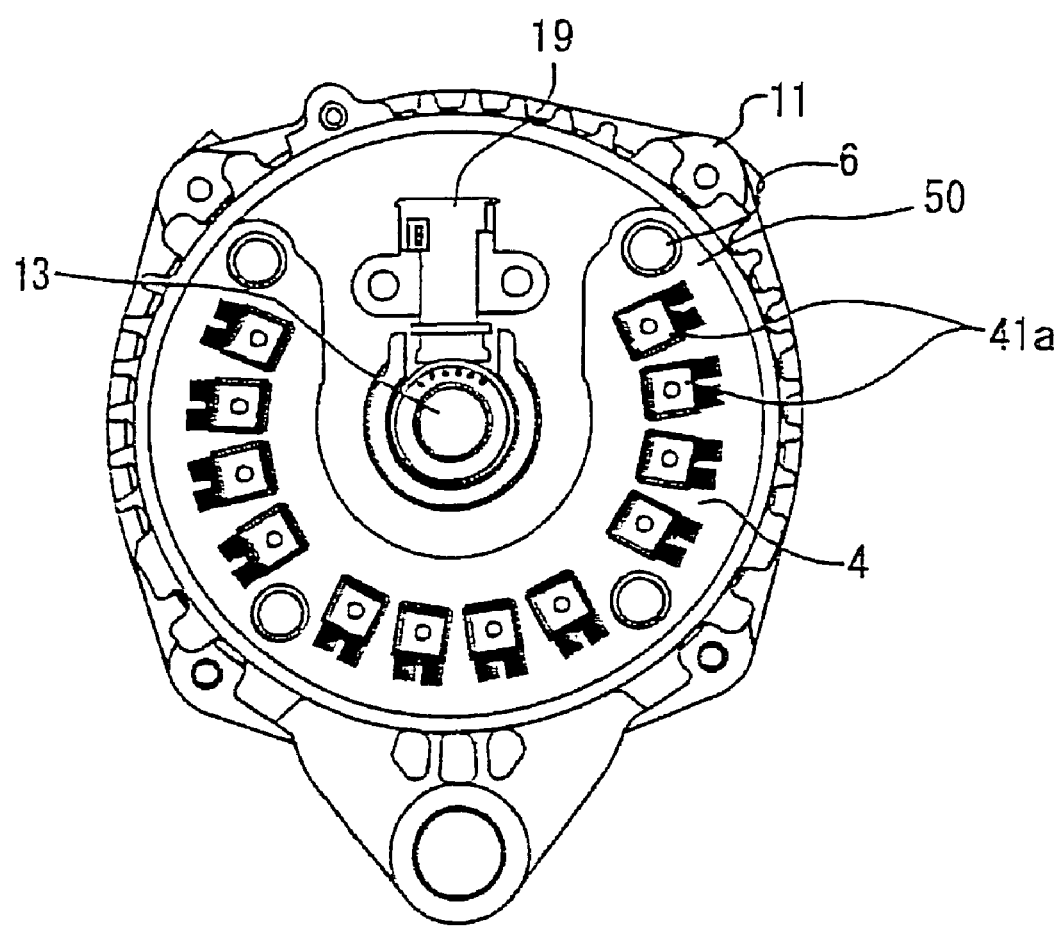
FIG. 2 is a side view taken along the axial direction of a power element unit of FIG. 1.

FIG. 1 is a cross sectional view showing a first embodiment of a rotating electric machine for vehicles according to the invention, and FIG. 2 is a side view of a power element unit of FIG. 1 taken along the axial direction. This rotating electric machine for vehicles is a rotating electric machine in which the power element unit is mounted as an integral part, or in the vicinity thereof.

As shown in FIG. 1, the rotating electric machine 1 is provided with a housing formed of a front bracket 10 and a rear bracket 11, a stator 16 including an armature winding 16a, and a rotor 15 including a shaft (rotary shaft) 13 and a field winding 14. In this rotating electric machine 1, the stator 16 is supported in and fixed to the housing, and the rotor 15 is located inside the stator 16 so that the field winding 14 thereof is opposite to the armature winding 16a; as well as the shaft 13 of the rotor 15 is supported by supporting bearings 12 that is located at the housing, and the rotor 15 can rotate coaxially with the stator 16. To both of the axial end faces of the rotor 15, cooling fans 17 are fixed.

A pulley 18 is fixed to the end portion on the front side of the shaft 13 (on the outside of the front bracket 10). A brush holder 19 is attached to the rear bracket 11 on the rear side of the shaft 13 (on the outside of the rear bracket 11); a pair of slip rings 21 is mounted onto the rear side of the shaft 13; and a pair of brushes 20 to slide in contact with the slip rings 21 is located in the brush holder 19. Further, a rotational position detection sensor (e.g., resolver) 22 is provided at the rear side end of the shaft 13. The pulley 18 is connected to a rotary shaft of an engine via a belt, not shown, and the rotation of the engine is transmitted to the pulley 18. The brush holder 19, the brushes 20 and the slip rings 21 form a power supply mechanism for supplying a DC power to the field winding 14.

A cover 30 that cover the power supply mechanism such as brush holder 19 is provided on the further rear side of the rear bracket 11. A power element unit 4 is located at a space between the rear bracket 11 and the cover 30. A control circuit board 44a on which a control circuit 44 is mounted is located on the axially outer wall surface of the cover 30, and this control circuit board 44a is covered with a plate 32.

The power element unit 4 includes a pair of an inside heat sink 50 and an outside heat sink 51 in opposition forming a predetermined gap in the axial direction. The inside heat sink 50 and the outside heat sink 51 are fixed to the rear bracket 11 with a support bar 6 shown in FIG. 2. As shown in FIGS. 1 and 2, plural sets of switching elements 41a and 41b of the upper arm and the lower arm are arrayed in a circumferential direction on the opposed inner wall surfaces in the axial direction of the inside and outside heat sinks 50 and 51. The inside and outside heat sinks 50 and 51 are provided with cooling fins 50a and 51a including flow paths in the radial direction on the axially opposed outer wall surfaces. As a result of providing the inside heat sink 50 and the outside heat sink 51, a larger cooling effect is achieved.

It is preferable that the cooling fins 50a and 51a are located all over the faces of the inside and outside heat sinks 50 and 51, or located at regular intervals in the circumferential direction.

The switching elements 41a and 41b are joined to the inside and outside heat sinks 50 and 51 by soldering respectively.

A ventilation hole 31a opposed to the outer peripheral ends of each of the cooling fins 50a and 51a is provided on the axial wall of the cover 30. Another ventilation hole 32a is formed on the face of the plate 32 as well. Thus, an outside air is caused to flow axially from the ventilation hole 32a and the ventilation hole 31a. The ventilation holes 31a and 32a are preferably open so as to be opposite to the switching elements 41a and 41b. Forming one flow passage with the ventilation holes 31a and 32a can make the structure simpler.

By the rotation of the cooling fans 17, as shown with arrows F, there is formed an air course of a fresh outside air that flows in axially from the ventilation holes 32a and 31a and passing through each of the cooling fins 50a and 51a, and goes through a suction port 11a to a discharge port 11b of the rear bracket 11 to go out. Thus, the inside and outside heat sinks 50 and 51 are cooled with a fresh outside cooling air all the times. Preferably, the suction port 11a of the rear bracket 11 is formed at portions in the vicinity of the inner circumferential ends of the cooling fins 50a and 51a in view of enhancement in cooling effect.

As mentioned above, the inside and outside heat sinks 50 and 51 are cooled by the fresh outside cooling air at all times, so that a cooling performance of cooling the switching elements 41a and 41b can be improved. Furthermore, the space between the rear bracket 11 and the cover 30 is utilized, so that the entire rotating electric machine can be small-sized.

As shown in FIG. 2, a power element unit 4 is formed of three-phases, U, V, W of sections (U-phase section, V-phase section, and W-phase section) of the switching elements 41a of the upper-side arm in which phase four switching elements 41a are connected in parallel on the wall surface of the inside heat sink 50, and three phases, U, V, W of sections (U-phase section, V-phase section, and W-phase section) of the switching elements 41b of the lower-side arm in which phase four switching elements 41b are connected in parallel on the wall surface of the outside heat sink 51. The switching element 41a and 41b may be discrete type, TPM type, or bare-chip type.

In this manner, by connecting plural numbers of switching elements 41a and 41b in parallel respectively, the amount of current to carry through each of the switching elements 41a and 41b can be made smaller. Consequently, it is possible to employ inexpensive switching elements 41a and 41b of a small current-carrying capacity, and thus to reduce costs.

Figure 3:
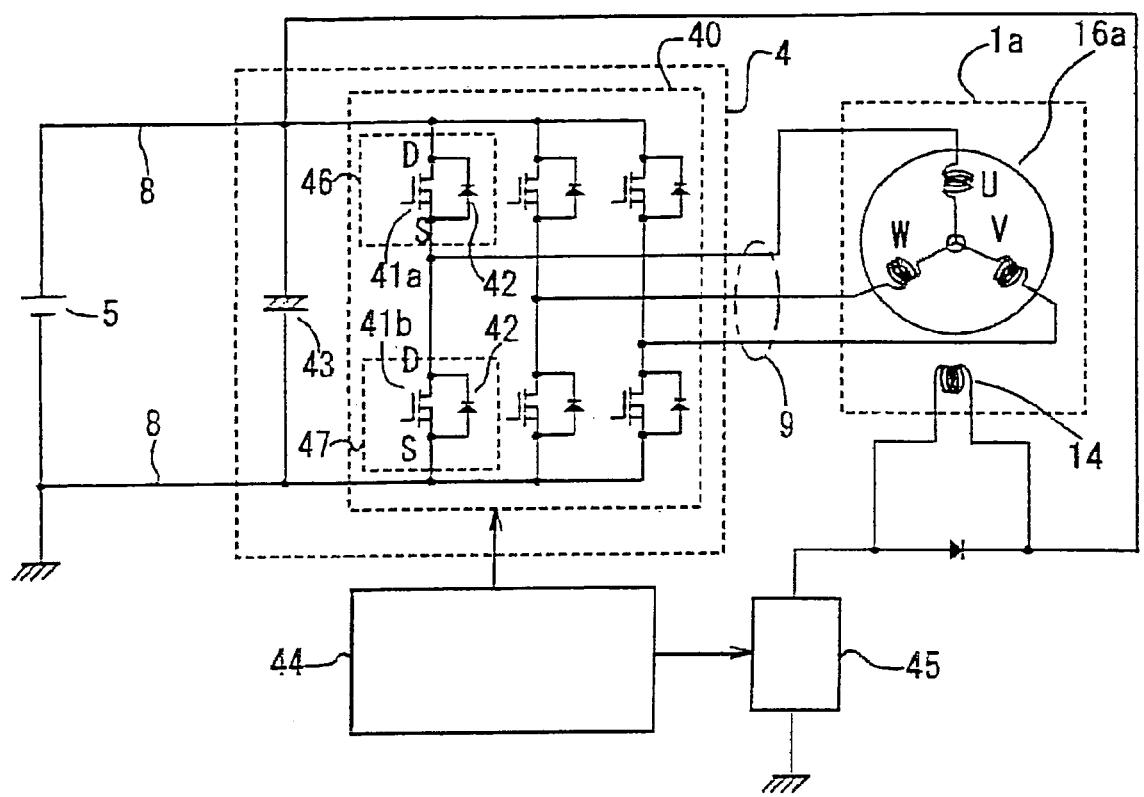
FIG. 3 is a circuit diagram for explaining operation of the rotating electric machine provided with the power element unit.

FIG. 3 is a circuit diagram for explaining operation of a rotating electric machine provided with a power element unit.

As shown in FIG. 3, a rotating electric machine section 1a is provided with an armature winding 16a wound around a stator, and a field winding 14 wound around a rotor. The armature winding 16a is constructed of three phases (U-phase, V-phase, W-phase) of coils in Y-connection (star-connection). The power element unit 4 is provided with an inverter module 40 that is formed of a plurality of switching elements (power transistor, MOSFET, IGBT or the like) 41a and 41b, and diodes 42 connected in parallel to each of the switching elements 41a and 41b, and a capacitor 43 that is connected in parallel to the inverter module 40. In the inverter module 40, the switching element 41a and diode 42 forming an upper arm 46 and the switching element 41b and diode 42 forming a lower arm 47 that are connected in series constitutes one set, and these three sets are connected in parallel.

Ends of each phase of the Y-connection in the armature winding 16a are electrically connected to intermediate points between the switching elements 41a of the upper arm 46 and the switching elements 41b of the lower arm 47 in corresponding sets via an AC wiring 9. Furthermore, a positive electrode terminal and a negative electrode terminal of a battery 5 are electrically connected to the positive electrode side and the negative electrode side of the inverter module 40 via a DC wiring 8 respectively.

The switching operation of each of the switching element 41a and 41b in the inverter module 40 is controlled by commands from a control circuit 44. Further, the control circuit 44 controls a field current control circuit 45 to adjust a field current carrying through the field winding 14 of the rotor.

With reference to the circuit diagram shown in FIG. 3, when the engine is started, a DC power is supplied to the power element unit 4 via the DC wiring 8 from the battery 5, the control circuit 44 makes ON/OFF control of each of the switching elements 41a and 41b of the inverter module 40, and the DC power is converted to a three-phase AC power. A three-phase AC power having been converted is supplied to the armature winding 16a of the rotating electric machine section 1a via the AC wiring 9, a rotating magnetic field is given around the field winding 14 of the rotor to which a field current is supplied from the battery 5 by means of the field current control circuit 45, the rotor is driven to rotate, and then the engine is started via a pulley attached to the shaft of the rotor, a belt, a crank pulley, and a clutch (ON).

When the engine is started, a rotational power of the engine is transmitted to a rotor via the crank pulley, the belt, and the pulley attached to the shaft of the rotor of the rotating electric machine section 1a, the rotor is driven to rotate resulting in induction of a three-phase AC voltage at the armature winding 16a, the control circuit 44 makes ON/OFF control of each of the switching elements 41a and 41b, the three-phase AC voltage having been induced at the armature winding 16a is converted to a DC power, and the battery 5 comes to be charged.

Embodiment 2

Figure 4:
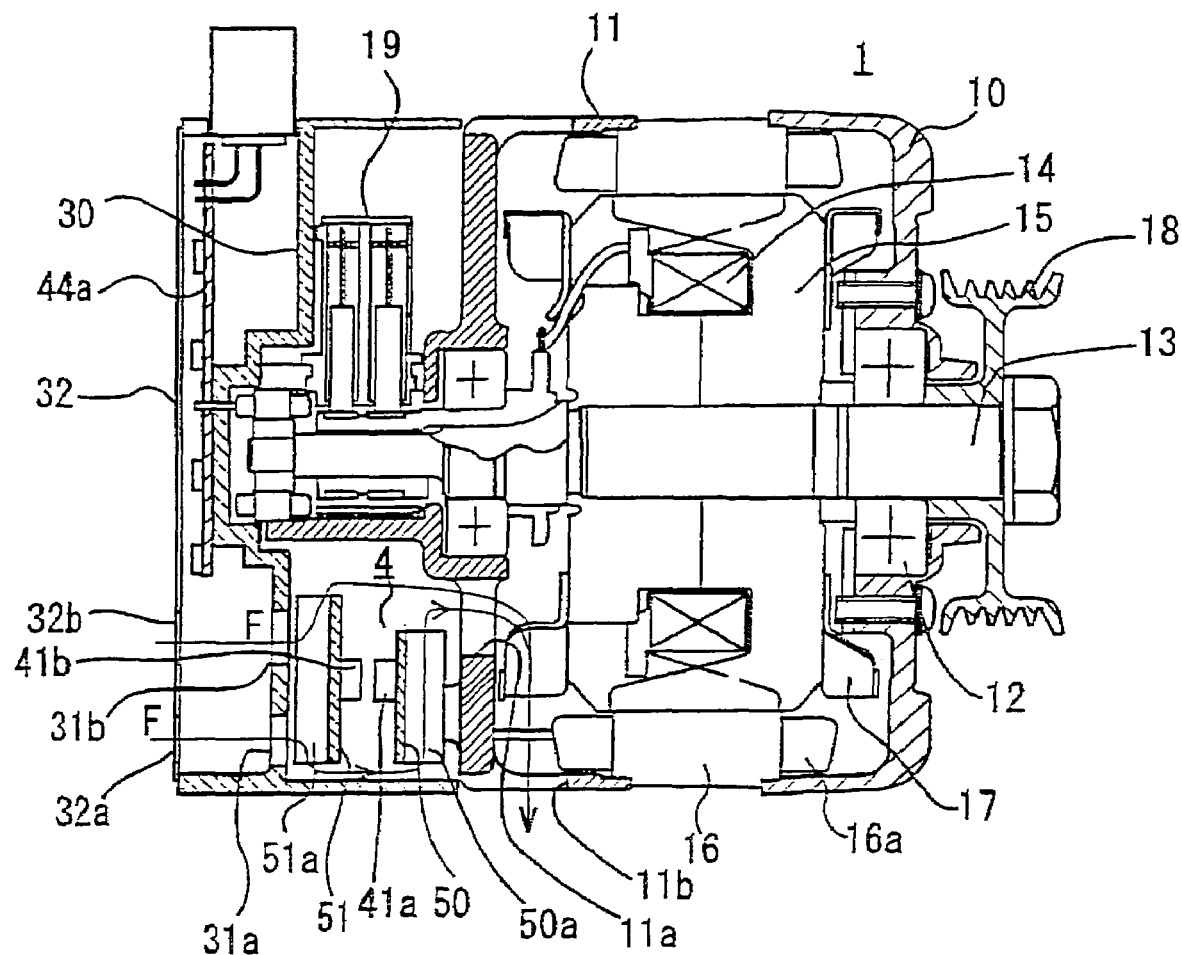
FIG. 4 is a cross sectional view showing a second embodiment of the rotating electric machine for vehicles according to the invention.

FIG. 4 is a cross sectional view showing a second embodiment of the rotating electric machine for vehicles according to the invention, and the same reference numerals indicates the same or like parts as those in FIG. 1.

With reference to FIG. 4, the construction of each part is substantially the same as in the above-mentioned first embodiment. There are differences from the first embodiment in the aspects that there is further provided a ventilation hole 31b on the inner circumferential side of the ventilation hole 31a in the cover 30, and that there is further provided a ventilation hole 32b on the inner circumferential side of the ventilation hole 32a in the plate 32.

According to this second embodiment, when the cooling fan 17 is brought in rotation, as indicated by the arrows F, an air course is formed such that a fresh outside air is sucked in at two points of the ventilation holes 32a and 31a and the ventilation holes 32b and 31b, passing through each of the cooling fins 50a and 51a, and goes through from a suction port 11a to a discharge port 11b of the rear bracket 11 to go out.

As mentioned above, the inside and outside heat sinks 50 and 51 are cooled by a fresh outside cooling air at all times, so that a cooling performance of cooling the switching elements 41a and 41b can be improved. Further, the space formed between the rear bracket 11 and the cover 30 is utilized, so that the entire rotating electric machine can be small-sized. Furthermore, as a result of providing two flow passages of the outside air, it is possible to make the cooling effect larger.

In addition, according to the above-mentioned first and second embodiments, although an example, in which the switching elements 41a and 41b are located at the heat sinks 50 and 51 respectively, is described, it is preferable that one of the switching elements 41a and 41b is mounted onto a heat sink, and the other switching elements are mounted on, for example, the surface of a mere resin plate. Furthermore, it is preferable that both of the heat sinks are eliminated, and that, for example, the switching elements 41a and 41b are mounted on a pair of resin plate surfaces respectively.

It is also preferable to be with no plate 32.

In addition, although a rotating electric machine for vehicles, in which the field winding 14 of the rotor 15 and the brush holder 19 are located, is described, the above-mentioned embodiments according to the invention can be applied to any other rotating electric machine for vehicles in which a magnetic pole of a rotor is formed of a permanent magnet, and there are not the field winding 14 and the brush holder 19.

The rotating electric machine for vehicles according to the invention can be effectively utilized as a rotating electric machine to be mounted on, e.g., automobiles.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A rotating electric machine for vehicles comprising:
a stator provided with an armature winding;
a rotor including a rotary shaft, and which is located inside said stator;
a cooling fan located at said rotor;
a housing that supports and fixes said stator, as well as supports said rotary shaft in a rotatable manner; and
a cover that is located outside of one wall surface of said housing in an axial direction of said rotary shaft so as to cover said one wall surface, and that forms a space with said one wall surface of said housing;
first and second switching elements of an upper arm and a lower arm that are connected in series forming an inverter circuit to be connected to said armature winding, wherein said first and second switching elements are disposed adjacent to each other in the axial direction of said rotary shaft;
a first heat sink attached to said first switching element;
a first cooling fin attached to said first heat sink, said first cooling fin disposed in a radial direction of said rotary shaft;
a second heat sink attached to said second switching element;
a second cooling fin attached to said second heat sink, said second cooling fin disposed in a radial direction of said rotary shaft;
a ventilation hole for sucking an outside air is formed on a wall in the axial direction of said rotary shaft of said cover;
a suction port through which an air in said space is sucked into said housing is formed in said one wall of said housing;
a discharge port through which the air in said housing is discharged is formed in the radially outer circumferential portion of said housing,
wherein, when said cooling fan is brought in rotation, a first portion of said outside air flows axially from said ventilation hole, goes through said suction port, flows radially through said first cooling fin in a direction toward said rotor shaft, and then is discharged from said discharge port, and a second portion of said outside air flows axially from said ventilation hole, goes through said suction port, flows radially through said first cooling fin in a direction away from said rotor shaft, flows radially through said second cooling fin in a direction toward said rotor shaft, and then is discharged from said discharge port, and wherein said first and second portions of said outside air flow directly from the ventilation hole towards an outer peripheral end of said first cooling fin.

2. The rotating electric machine for vehicles according to claim 1, wherein said switching elements of the upper arm and the lower arm are disposed opposite to each other in the axial direction.

3. The rotating electric machine for vehicles according to claim 1, wherein said ventilation hole is formed on the wall of said cover with respect to said switching elements of the upper arm and the lower arm.

4. The rotating electric machine for vehicles according to claim 1, wherein said ventilation hole is formed on the outer circumferential side and inner circumferential side of said cover.

5. The rotating electric machine for vehicles according to claim 1, wherein said ventilation hole is formed along same parallel axis to said cooling fan and near an edge of said cooling fan such that optimal air flow is created over said first and second cooling fins.

6. The rotating electric machine for vehicles according to claim 1, wherein said suction port is formed along same axis as the ventilation hole and in close proximity to the switching elements such that optimal air flow is created over said first and second cooling fins.

7. The rotating electric machine for vehicles according to claim 1, wherein the switching elements face each other in the axial direction of said rotary shaft.

8. The rotating electric machine for vehicles according to claim 1, wherein the second portion of said outside air flows through substantially more of said second cooling fin than through said first cooling fin.

9. The rotating electric machine for vehicles according to claim 8, wherein the first portion of said outside air flows from said first cooling fin to the discharge port via the suction port without flowing through said second cooling fin.

* * * * *